United States Patent [19]

Muller et al.

[11] Patent Number: 4,914,161

[45] Date of Patent: Apr. 3, 1990

[54] IONICALLY CONDUCTIVE MACROMOLECULAR MATERIAL

[75] Inventors: Daniel Muller; Jean-Michel Chabagno; Hervé Cheradame, all of Pau; Jean-Francois Le Pert, Grenoble; Michel Leveque, Le Fayet, all of France

[73] Assignees: Societe Nationale Elf Aquitaine, Courbevoie, France; Hydro-Quebec, Montreal, Canada

[21] Appl. No.: 884,604

[22] Filed: Jul. 11, 1986

[30] Foreign Application Priority Data

Jul. 12, 1985 [FR] France ............................. 85 10737
Dec. 11, 1985 [FR] France ............................. 85 18352

[51] Int. Cl.$^4$ ..................... C08G 65/32; C08F 283/00
[52] U.S. Cl. ........................................... 525/403; 525/405; 525/474; 525/528; 528/395
[58] Field of Search ............ 525/403, 405, 474, 528; 528/395

[56] References Cited

U.S. PATENT DOCUMENTS

| | | | |
|---|---|---|---|
| 3,862,077 | 1/1975 | Schulz et al. | 525/311 |
| 4,357,401 | 11/1982 | Andre et al. | 429/192 |
| 4,471,037 | 9/1984 | Bannister | 429/191 |
| 4,505,997 | 3/1985 | Armand et al. | 429/192 |
| 4,542,081 | 9/1985 | Armand et al. | 429/192 |
| 4,547,313 | 10/1985 | Vives | 252/518 |
| 4,556,614 | 12/1985 | le Mehaute et al. | 429/191 |
| 4,556,615 | 12/1985 | Bannister | 429/192 |
| 4,556,616 | 12/1985 | Armand et al. | 429/192 |
| 4,578,326 | 3/1986 | Armand et al. | 429/192 |

FOREIGN PATENT DOCUMENTS

| | | |
|---|---|---|
| 37776 | 11/1982 | European Pat. Off. . |
| 104726 | 10/1983 | European Pat. Off. . |
| 96629 | 3/1985 | European Pat. Off. . |
| 122633 | 10/1985 | European Pat. Off. . |
| 78505 | 12/1985 | European Pat. Off. . |
| 2524722 | 7/1983 | France . |
| 2118763 | 4/1982 | United Kingdom . |
| 2124635 | 2/1984 | United Kingdom . |
| 2119162 | 12/1985 | United Kingdom . |

OTHER PUBLICATIONS

Journal of Power Sources, vol. 14, No. 1/3, Jan.-Mar. 1985, pp. 13-21, Elsevier Sequoia, Lausanne, CH, Netherlands, I. E. Kelly et al.: "Poly(Ethylene Oxide) Electrolytes for Operation at Near Room Temperature".
Solid-State Ionics, vol. 14, No. 2, Oct. 1984, pp. 85-91, North-Holland, Amsterdam, NL; K. Shigehara et al.: "Ionic Conductivity of LiX-Oligo(Ethylene Oxide)-Perfluoro Polymer Ternary Hybrids".

*Primary Examiner*—Morton Foelak
*Assistant Examiner*—Kriellion Morgan
*Attorney, Agent, or Firm*—Oblon, Spivak, McClelland, Maier & Neustadt

[57] ABSTRACT

Ionically conductive macromolecular material constituted by a salt in solution in a polymer, the said salt comprising an anion present in the form of a polyether chain one end of which carries an anionic function and which can be applied to the obtention of electrochemical accumulators.

10 Claims, No Drawings

IONICALLY CONDUCTIVE MACROMOLECULAR MATERIAL

BACKGROUND OF THE INVENTION

1. Field of the Invention

The present invention concerns a novel ionically conductive macromolecular material comprising a novel family of salts in solution in a polymer.

Ionically conductive macromolecular materials such as described in European patent 013 199 are constituted by a solid solution of an alkaline metal salt in a polymer the chain of which recurrently comprises at least one hetero-atom having the solvating properties of lithium salts. A family of preferred polymers of this European patent includes the polyethers, in particular, polyoxyethylene and/or ethylene oxide copolymers.

The salt to be dissolved must present certain specific qualities. It must be electrochemically stable and have a high ionic disassociation rate. Furthermore, it must be capable of forming with the polymer a solid solution that remains homogeneous in wide concentration and temperature ranges in order to prevent any precipitation of the non conductive crystalline phases within the electrolyte.

Due to the model of the electrochemical reactions occurring in the electrochemical generators using electrolytes obtained according to European patent 013 199, it is necessary that the salt confers upon the electrolyte a very high cationic conductivity with respect to the anionic conductivity, the ideal situation being that the conductivity is exclusively cationic.

It has thus been proposed to reduce the mobility of the anions by using salts having a high molecular weight or salts that are very bulky such as those described in French patent applications 82 09538, 82 09539 and 82 04540 filed on June 1, 1982 in the name of Agence Nationale de Valorisation de la Recherche or in French patent application 82 05623 filed by the Agence Nationale de Valorisation de la Recherche on Mar. 18, 1982.

The use of these large anion salts is limited by the fact that if it is desired to reach a reasonable concentration of lithium cations, it is necessary to introduce into the polymer a strong concentration of the anion associated to the lithium, whereby the dielectric constant of the medium and thus its solvation and dissociation power may be impaired, this being, in particular the case of anions having a very high molecular weight.

The object of the invention is thus to provide a novel family of salts the anions of which are the least mobile when in solution in a polymer and which are completely compatible with the polymer.

With this object in view, the invention provides an ionically conductive macromolecular material constituted by at least one salt in solution in a macromolecular weight, the said macromolecular material being mainly constituted by an amorphous structure of the polyether type. According to the invention, the said salt is a salt represented by formula (I):

$$R-F-M \qquad (I)$$

in which:
M is an alkali metal, in particular lithium;
R is a polyether type structure;
F represents a group conferring on the polyether type structure one or several functions selected from among alcoholates, sulfonates, sulfates, phosphates, phosphonates, amides, carboxylates, borates, aluminates, thiophosphates, perhalogenosulphonates, in particular the dihalogenosulphonates, and the perhalogenocarboxylates.

The polyethers of the anions of the salts according to the invention can have high molecular weights. They do not impair the solvating power of the macromolecular material in which the salts are in solution, since they have the same structure as the said materal.

Due to this high molecular weight, the R-F-anion is almost immobile in the macromolecular material, which means that the solid solution obtained presents an ionic conduction of an essentially cationic nature.

With the alcoholate functions, it is possible to obtain according to the present invention salt functions of alkali metals of acid complexes according to formula (II):

$$-OM_tX^-{}_n\!.M^+ \qquad (II)$$

These acids being obtained by reacting an alkali alcoholate —OM with a Lewis acid of the Friedel and Krafts $M_tX_n$ type where $M_t$ represents in the Periodic Classification of Elements, an element of column 3, such as for example boron, or an element of column 4 such as for example tin, or an element of column 5 such as arsenic.

Among the preferred Lewis acids can be selected $BF_3$, $BCl_3$, $SbCl_5$, $SbCl_3$, $AsF_5$, $TiCl_4$, $SnCl_4$. A salt according to formula (III) is thus obtained:

$$R-OM_tX^-{}_nM^+ \qquad (III)$$

According to one preferred embodiment of the invention, the function conferred by the group F, or the ionisable function, is a carboxylated function represented by the formula:

$$-CF_2CO_2M \qquad (V)$$

and is derived from a carboxylic acid fluorated in α of formula (VI):

$$-CF_2CO_2H$$

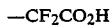

M having the same significance as in formula (I), so that a salt of formula (X) is obtained:

$$R-CF_2CO_2M$$

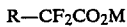

in which R has the same significance as in formula (I).

According to another embodiment of the invention, the polyether chain of the anion is itself constituted by a functionalized polyether of formula (XI):

$$R_1-F_1-M_1 \qquad (XI)$$

in which $R_1$, $F_1$ and $M_1$ have the same significances as in formula (I), so that the anion, object of this embodiment according to the invention, can be represented by the formula (XII):

$$M_1-F_1-M_1-F-M \qquad (XII)$$

Preferably, $M_1$, $F_1$ and F, M are identical.

These salts are dianionic and each anionic group is separated from the other by a polyether chain. They present a particularly low mobility due to the increase of the molecular tangling to which the materials are subject.

According to another characteristic of the invention, the macromolecular material comprises, furthermore, a second salt represented by the formula (XIII):

MX          (XIII)

in which:
M has the same significance as in formula (I); and
X represents an anion of a strong acid.

The preferred anions are those described in European patent application 013 199 and in particular anion $ClO_4^-$.

Another advantage of the salts according to the invention and the ionically conductive macromolecular materials obtained thereby lies in the improvement of the wetting qualities presented by the electrolyte with respect to the electrodes materials in the composite electrodes, i.e. in the electrode materials in which each grain of active material is completely embedded in a ionically conductive macromolecular material, whether this material is the same as that constituting the electrolyte or whether it is different therefrom by the nature and the constitution of the chain.

But according to a further characteristic of the invention, the salt represented by formula (I) is grafted onto at least one part of the macromolecular material constituting the electrolyte, and each of the macromolecules thus grafted may carry one or several chains at the anionic end.

In order to obtain this grafting, it is possible for example to carry out a polycondensation of a polyetherglycol of a polyether chain, one end of which carries the anion and the other end of which carries an alcohol group or any other group able to react with a polycondensation agent.

Such types of polycondensation are, for example, described in French patent application no. 84 13925 dated Sept. 11, 1984.

According to a first variant of this embodiment, the first and the second structure of the polyether type derived from one monomer structural unit or identical monomer units and the first structure is linear and carries a single second structure grafted on the first.

According to a second variant of the same embodiment, at least two second structures are grafted onto the first structure, the copolymer thus obtained having a combshaped structure.

Such a macromolecular material obtained according to the present invention, can be represented by the formula:

A(R—F—X)x         (XV)

formula in which:
A is a high weight molecular polyether chain;
R, F and X have the same significance as in the formula (I), the molecular weight of R being lower than of A;
x is the number of graftings carried by the polyether chain.

The essential advantage of such a process lies in the limitation of the mobility of the anionic site with respect to the chain of the solvent polymer. In fact, the anionic site is bound to the main chain by the intermediary of the polyether chain of the anion (chain-R- formula I) and its mobility is physically limited by the mobility of the polyether chain and of the anion and its stretching properties. Furthermore, with such a process, it is possible to increase the salt concentration in the polymer solvent without risk of increasing the vitreous transition temperature, as would occur if the anionic grouping were fixed directly onto the chain of the polymer solvent without interposing the polyether group.

The present invention and its advantages will become more apparent from the following examples given by way of non-limitative illustration.

FIRST SERIES OF EXAMPLES

Conductivity measurements

Measurements of conductivity for the ionically conductive materials for different salt according to the invention are made. The macromolecular solvent material was constituted by a EO/PO copolymer at 95% EO by weight. The following results are obtained for temperatures for obtention of conductivity values respectively equal to $10^{-7}$, $10^{-6}$, $10^{-5}$ ohm$^{-1}$ cm$^{-1}$, referenced $T_7$, $T_6$, $T_5$, the atomic oxygen/lithium ratio being referenced O/Li for each example.

| | |
|---|---|
| (1) Alcoholates | |
| $C_8H_{17}$—O—Li | $T_7 > 130°$ C. |
| | O/Li = 20 |
| $CH_3$—O—$CH_2$—$CH_2$—O—Li | $T_7 = 60°$ C., |
| | $T_6 = 130°$ C. |
| | O/Li = 12 |
| $CH_3(O—CH_2—CH_2)_3$—O—Li | $T_7 = 40°$ C., |
| | $T_6 = 60°$ C. |
| | O/Li = 12 |
| $CH_3(O—CH_2—CH_2)_{14}$—O—Li | $T_7 = 40°$ C., |
| | $T_6 = 60°$ C. |
| | O/Li = 7 |
| (2) Borates (O/Li = 20) | $T_7 = 130°$ C., |
| $B(O—CH_3)_4$ | |
| $CH_3$—$O(CH_2—CH_2—O)_2BOCH_3Li$ | $T_7 = 39°$ C., |
| | $T_6 = 130°$ C. |
| $CH_3$—$O(CH_2—CH_2—O)_3BOCH_3Li$ | $T_7 = 28°$ C., |
| | $T_6 = 74°$ C. |
| (3) Fluoroborates | |
| $LiBF_4$ | $T_7 = 150°$ C., |
| | $T_6 = 30°$ C. |
| | $T_5 = 40°$ C, |
| | O/Li = 20 |
| $CH_3$—$O(CH_2—CH_2—O)_2BF_3Li$ | $T_7 = 11°$ C., |
| | $T_6 = 22°$ C. |
| | $T_5 = 35°$ C. |
| | O/Li = 20 |
| $CH_3$—$O(CH_2—CH_2—O)_3BF_3Li$ | $T_7 = 10°$ C., |
| | $T_6 = 20°$ C. |
| | $T_5 = 30°$ C., |
| | O/Li = 12 |
| (4) Sulphonates and derivatives (O/Li = 20) | |
| Cl—$CH_2$—$CH_2$—$SO_3Li$ | $T_7 = 30°$ C., |
| | $T_6 = 68°$ C. |
| $CH_3(O—CH_2—CH_2)_{10}$—O—$CH_2$—$CH_2$—$SO_3Li$ | $T_7 = 35°$ C., |
| | $T_6 = 60°$ C. |

SECOND EXAMPLE

By way of comparison, two solid polymer electrolyte generators each constituted by a lithium negative electrode and a positive electrode were produced.

The positive electrolyte was the same for the two accumulators and was constituted by an agglomerate of molybdenum oxide, carbon black and an ionically conducting macromolecular material constituted by a solid solution of 10% by weight of $LiClO_4$, in an ethylene oxide and glycidylmethylether copolymer with a ratio of 4/1 by weight. The two generators differ from each other by their electrolyte.

(1) Prior art
Electrolyte: EO-GME copolymer, LiClO$_4$ in a quantity of 10% by weight, thickness 65 microns.

(2) Invention
Electrolyte: EO-GME copolymer, salt: CH$_3$-O(CH$_2$-CH$_2$-O)$_3$BF$_3$Li in a quantity of 20% by weight, thickness 65 microns.

These two generators have been discharged at 30° C. under a current of 125 micro-Ampere per square cm. The discharge was interrupted when 1 B had been obtained.

For generator 1, the discharge lasted 8 h and for generator 2, the discharge lasted 25 h.

This result can be attributed to the reduced mobility of the polyether long chain sulphonate anions that prevent accumulation of the salts at the level of the electrodes. It thus renders evident the advantages of the invention.

EXAMPLE 1

11.5 g of a grafted copolymer constituted by a polydimethylsiloxane trunk presenting a molecular weight of about 700 and grafted with (OCH$_2$CH$_2$)$_9$ groups of molecular mass of about 200, are dried under high vacuum (<10$^{-2}$ mmHg) at 100° C. during 8 hours. Thereafter is added at low temperature and in a dry nitrogen atmosphere 6 ml of tetrahydrofuran then 5.8 ml of a solution 1.6M of lithium butyl in hexane. Thereafter, 11.8 ml of a solution 10% by volume of SbCl$_5$ in methylene chloride is added to the previous reaction medium maintained at 0°. Thus, a grafted polyol is obtained of which 25% of the alcohol functions are converted into lithium alcoholates, an then into a R-O-SbCl$_5$-Li function through the action of SbCl$_5$.

The other non converted alcohol functions are utilized for crosslinking by reaction with cross-linking agent such as the polyisocyanates, alkylchlorosilanes, alkylaluminum, etc.

In this example, a polyurethane is produced by adding after evaporation of all the solvents, 12.8 ml of a 0.84M solution of 4,4',4''-methylidine trisphenylisocyanate in CH$_2$Cl$_2$ and 5.10$^{-2}$ ml of tin dibutyl dilaurate.

The reaction mixture is placed, under controlled atmosphere, in a mold constituted by two plates separated by a calibrated seal so as to produce a thin film after cross-linking. The mixture is left in the mold for 24 hours at ordinary temperature. The cross-linking is achieved through baking under vacuum at 60° C.

In order to ensure a cationic transport number equal to 1, it is possible to extract the membrane while protecting, it against humidity, by means of a soxhlet, using methylene chloride under conditions reflux on sodium for 12 hours. The membrane thus prepared has a cationic conductivity of 10$^{-5}$Ω$^{-1}$ at 100° C.

EXAMPLE 2

13.6 g of a sequenced copolymer (poly-propyleneoxide-ethyleneoxide) triol having a molecular weight of about 2,600 are dried under high vacuum (<10$^{-1}$ mmHg) at 100° C. for 8 hours. Thereafter, at low temperature and under a dry nitrogen atmosphere, 6 ml of tetrahydrofuran, then 3.2 ml of a 1.6M solution of lithium butyl in hexane are added. Thereafter, 6.7 ml of a solution by 10% in volume of SbCl$_5$ is added to methylene chloride, on the previous reactional mixture maintained at 0° C. Thus, a sequenced copolymer was obtained of which one of the three initial alcohol functions has been replaced by a R-O-Sb-Cl$_5$-Li function, this modified copolymer is thereafter submitted to a cross-linking reaction for which, after evaporation of all the solvents, 4.2 ml of a 0.84 molar solution of 4,4',4''-methylidine triphenylisocyanate and 5.12$^{-2}$ ml of tin dibutyl dilaurate is added. The reaction medium is processed as in example 1 in order to obtain a thin cationically conducting membrane. The membrane thus prepared has a conductivity of 10$^{-4}$ Ω$^{-1}$ cm$^{-1}$ at 100° C. and 10$^{-6}$ Ω$^{-1}$ cm$^{-1}$ at 20° C.

EXAMPLE 3

This example concerns a sodium salt.

11.5 g of a grafted oligomer copolymer constituted by a polydimethylsiloxane trunk of a moleuclar weight of about 700, grafted with 9 ethylene polyoxide graftings having a molecular weight of about 200 is dried under high vacuum (<10$^{-2}$ mmHg) at 100° C. for 8 hours. Thereafter a low temperature and under a dry nitrogen atmosphere, 6 ml of tetrahydrofuran and then 0.23 g of sodium hydride are added. After reaction, 11.8 ml of a 10M solution by volume of SbCl$_5$ is added to methylene chloride on the previous reaction mixture maintained at 0° C.

After evaporation of all the solvents, 21.5 ml of a 0.50M solution of 4,4',4''-methylidine tris (phenylisocyanate) and 5.10$^{-2}$ ml of tin dibutyl dilaurate tin is added. After processing the reaction mixture as in example 6, a cationically conductive membrane is obtained. The conductivity is about 10$^{-6}$ Ω$^{-1}$ cm$^{-1}$ at 80° C.

EXAMPLE 4

Polyether functionalized by the lithium perfluoroglutarate 2.2 g of hexafluoroglutaric acid HOOC (CF$_2$)$_3$COOHG are semi-neutralized in solution in water by the corresponding quantity of lithium hydroxide. The diacid is thus converted into lithium monosalt.

After drying this monosalt under high vacuum, 10 cc of anhydrous tetrahydrofuran is introduced, then 0.66 cc of thionyl chloride under a dry nitrogen atmosphere. The reaction mixture is thoroughly stirred for one hour.

A derivative of perfluoroglutaric acid is thus obtained which carries, on the one hand, a lithium carboxylate function and, on the other hand, an acid chloride function.

This latter function is used to graft the lithium perfluoroglutarate on one of the alcohol functions of a ethylene-triol polyoxide having a molecular weight of about 1,500 of which the two residual acid functions are used to form a self-ionisable network according to the techniques described in the previous examples.

The membrane of the polyurethane type thus prepared presents a conductivity of about 5.10$^{-6}$ (Ωcm$^{-1}$) at 100° C.

The same membrane can be obtained by replacing for example the perfluoroglutaric acid by the perfluorobutane dioic acid or 2,2,3,4,5-pentafluoro-3-chloroglutaric acid.

It is well understood that the present invention is in no way limited to the embodiments described hereinabove, but can on the contrary encompass all possible variants of the invention, without departing from the scope and spirit of the same.

We claim:

1. Ionically conductive macromolecular material consisting essentially of at least one salt in solution in or grafted onto a macromolecular material, said macromolecular material being mainly constituted by an amorphous polyether structure, wherein said salt is represented by the formula (I):

R—F—M    (I)

wherein:
M is an alkali metal;
R is a polyether structure consisting essentially of ethylene oxide or propylene oxide units, or mixtures thereof;
F represents a function selected from the group consisting of alcoholates, sulfonates, sulfates, phosphates, phosphonates, amides, carboxylates, borates, thiophosphates and perhalogenosulphonates and mixtures thereof.

2. The ionically conductive material according to claim 1, wherein said macromolecular material in which the salt is in solution is consisted by a homopolymer of ethylene oxide or a copolymer of ethylene oxide with propylene oxide or glycidylmethylether.

3. The ionically conductive material according to claim 1, wherein the R polyether structure itself consists essentially of a functionalized polyether of formula (II) $R_1$-$F_1$-$M_1$ wherein:
$M_1$ is an alkali metal,
$R_1$ is a polyether structure consisting essentially of ethylene oxiide or propylene oxide units, or mixtures thereof,
$F_1$ represents a group conferring on the polyether structure a function selected from the group consisting of alcoholates, sulfonates, sulfates, phosphates, phosphonates, amides, carboxylates, borates, thiophosphates and perhalogenosulfonates, and mixtures thereof.

4. The ionically conductive material according to claim 3, wherein ($M_1$, $F_1$) and (M, F) are identical.

5. The ionically conductive material according to claim 1, wherein said salt is grafted on at least one part of said macromolecular material.

6. The ionically conductive material according to claim 5, wherein the amorphous polyether structure of the macromolecular material and the R structure of the salt derives from the same monomer(s).

7. The ionically conductive material according to claim 6, wherein the R structure of the salt is linear and carries a single second structure grafted on the first.

8. The ionically conductive material according to claim 5, wherein at least two salts are grafted onto said macromolecular material.

9. The ionically conductive material according to claim 1, wherein M is lithium.

10. The ionically conductive material according to claim 3, wherein both M and $M_1$ are lithium.

* * * * *